(12) United States Patent
Livoratti et al.

(10) Patent No.: US 12,065,253 B2
(45) Date of Patent: Aug. 20, 2024

(54) EMERGENCY DEVICE ACTUATION ASSEMBLIES AND AIRCRAFT INCLUDING SAME

(71) Applicant: EMBRAER S.A., São José dos Campos—SP (BR)

(72) Inventors: João Carlos Livoratti, São José dos Campos—SP (BR); Carlo Rodrigo de Faria Marastoni, São José dos Campos—SP (BR); Mariana Camargo Dos Reis, São José dos Campos—SP (BR); Juliana Fabricio Rodrigues, São José dos Campos—SP (BR)

(73) Assignee: EMBRAER S.A., São José dos Campos—SP (BR)

( * ) Notice: Subject to any disclaimer, the term of this patent is extended or adjusted under 35 U.S.C. 154(b) by 345 days.

(21) Appl. No.: 17/557,347

(22) Filed: Dec. 21, 2021

(65) Prior Publication Data

US 2023/0192302 A1 Jun. 22, 2023

(51) Int. Cl.
*B64D 25/16* (2006.01)
*B64C 1/14* (2006.01)
*E05C 19/14* (2006.01)

(52) U.S. Cl.
CPC .......... *B64D 25/16* (2013.01); *B64C 1/1461* (2013.01); *E05C 19/145* (2013.01)

(58) Field of Classification Search
CPC .......... E05C 19/00; E05C 19/085; E05C 19/10; E05C 19/12; E05C 19/14; E05C 19/145; B64D 25/00; B64D 25/08; B64D 25/16; B64C 1/00; B64C 1/14; B64C 1/1407; B64C 1/1461
USPC .......................................... 292/113
See application file for complete search history.

(56) References Cited

U.S. PATENT DOCUMENTS

| | | | | |
|---|---|---|---|---|
| 3,107,370 A | * | 10/1963 | Gaylord | B64D 25/00 116/DIG. 9 |
| 3,165,763 A | * | 1/1965 | Gaylord | B63C 9/24 251/74 |
| 3,259,418 A | * | 7/1966 | Munday | B60D 1/04 294/82.27 |

(Continued)

*Primary Examiner* — Nathan Cumar
(74) *Attorney, Agent, or Firm* — NIXON & VANDERHYE P.C.

(57) ABSTRACT

Actuation assemblies for emergency devices (e.g., inflatable life rafts carried on-board an aircraft) are provided with enhanced (preferably multiple) levels of security to preclude inadvertent unlatching and/or deployment but also allow access to an on-board emergency device removably positioned within a device bay of the vehicle which is normally covered by an access panel. The actuation assembly may be provided with a rotatable actuation shaft, a manually operated actuation lever fixed to the actuation shaft so as to rotate the actuation shaft in response to movement of the actuation lever between stowed and deployed conditions thereof, and a safety locking system operably connected to the rotatable shaft and having a locked condition which prevents operation of the actuation lever to thereby maintain the actuation assembly in a safe mode during normal vehicle operation, and an armed mode which allows the actuation lever to be moved into the deployed condition thereof.

21 Claims, 13 Drawing Sheets

(56) References Cited

U.S. PATENT DOCUMENTS

| | | | | |
|---|---|---|---|---|
| 4,125,235 A * | 11/1978 | Fitzgerald | ............... | B64C 1/143 |
| | | | | 244/905 |
| 5,102,176 A * | 4/1992 | Duggal | ................. | B64D 25/14 |
| | | | | 244/905 |
| 5,180,121 A * | 1/1993 | Banks | .................... | E05F 15/72 |
| | | | | 49/237 |
| 6,641,445 B1 * | 11/2003 | Jurlina | ................... | B64D 25/14 |
| | | | | 441/41 |
| 6,644,596 B1 * | 11/2003 | Jurlina | ................... | B64D 25/14 |
| | | | | 244/905 |
| 2012/0193474 A1 * | 8/2012 | Lafon | ................... | B64D 25/16 |
| | | | | 244/129.4 |
| 2018/0134366 A1 * | 5/2018 | Merkel | ................ | B64C 1/1461 |

\* cited by examiner

EMERGENCY DEVICE ACTUATION ASSEMBLIES AND AIRCRAFT INCLUDING SAME

FIELD

The embodiments disclosed herein relate generally to actuation assemblies, for example, to allow emergency access and deployment of on-board emergency devices, particularly inflatable life rafts associated with an aircraft that can be accessed and deployed in the event of an emergency water landing and the resulting necessary occupant evacuation.

BACKGROUND

Aircraft are conventionally provided with on-board floatation devices that may be inflated and deployed during a water landing emergency necessitating occupant evacuation. On some transport class aircraft, the on-board floatation devices may be contained physically within an emergency floatation device bay located at an appropriate location within the fuselage. The emergency device may therefore be manually accessed by aircraft occupants when needed during an emergency. Several proposals to address the deployment of on-board aircraft emergency devices can be found, for example, in U.S. Pat. Nos. 3,107,370; 3,165,763; 5,102,176; 6,644,596 and 6,641,445, the entire contents of each patent being expressly incorporated hereinto by reference.

There are several requirements that are needed in order to provide a satisfactory on-board aircraft emergency floatation device deployment. By way of example, there must be a locking system which safely locks the inflatable emergency device against inadvertent inflation and deployment. It is also necessary to ensure that any aircraft fuselage access panels associated with bays that house the inflatable emergency device remain safely secured during normal aircraft flight operations but are capable of being reliably released to allow access and deployment of the floatation device when needed. It is towards fulfilling such needs that the embodiments disclosed herein are directed.

BRIEF DESCRIPTION

Broadly, the embodiments disclosed herein are directed toward actuation assemblies which provide enhanced (preferably multiple) levels of security to preclude inadvertent panel unlatching as well as inadvertent floatation device deployment.

According to some embodiments, an actuation assembly for a vehicle (e.g., an aircraft) is provided so as to allow access to an on-board emergency device removably positioned within a device bay of a vehicle and normally covered by an access panel. The actuation assembly may be provided with a rotatable actuation shaft, a manually operated actuation lever fixed to the actuation shaft so as to rotate the actuation shaft in response to movement of the actuation handle between stowed and deployed conditions thereof, and a safety locking system operably connected to the rotatable shaft and having a locked condition which prevents operation of the actuation handle to thereby maintain the actuation assembly in a safe mode during normal vehicle operation, and an armed mode which allows the actuation handle to be moved into the deployed condition thereof.

The safety locking system in certain embodiments will include (i) a manually operated lock button, (ii) at least one safety latch carried by the actuation shaft so as to be rotatable therewith, (iii) at least one latch stop mounted for rotatable movement into engaged and disengaged positions relative to the at least one safety latch, and (iv) a linkage assembly interconnecting the lock button and the at least one latch stop. Thus, operation of the latch button responsively causes the at least one latch stop to be rotatably moved from the engaged position and into the disengaged position thereby by the interconnecting linkage assembly whereby the actuation handle may be operated to rotate the actuation shaft.

Some embodiments of the actuation assembly will comprise a proximal bell crank operatively connected to the lock button, a distal bell crank operatively connected to the at least one latch stop and a connecting rod which operatively interconnects the proximal and distal bell cranks. According to these embodiments, therefore, operation of the lock button rotates the proximal bell crank which responsively rotates the distal bell crank by the connecting rod and thereby rotatably move the at least one latch stop into the disengaged position thereof relative to the at least one safety latch.

The linkage assembly may further comprise an energy retention device (e.g., spring) which exerts a force in a direction to encourage rotation of the at least one latch stop into the engaged position thereof relative to the at least one safety latch and/or a sensor system to sense the actuation assembly being in the armed mode.

If a sensor system is provided, some embodiments herein may therefore include a fixed position sensor, and a moveable sensor target operatively connected to the at least one latch stop so as to be pivotally movable therewith between a safe condition mode indication position wherein the sensor target is in adjacent covering relationship to the sensor when the at least one latch stop is in the engaged position thereof, and an armed condition mode indication position wherein the sensor target uncovers the sensor when the at least one latch stop is in the disengaged position thereof.

Further enhanced operational safety may be achieved by providing the actuation assembly with a latching system operatively interconnected to the actuation lever and a safety locking system. The latching system may include a drive link having a proximal end connected to the actuation shaft so as to be rotatable therewith, and an engagement shaft operably connected at one end to a distal end of the drive link and having an opposite end movable into and out of engagement with a latch hook associated with a latch of the access panel. Movement of the actuation handle into the deployed condition thereby causes the engagement shaft to move out of engagement with the latch hook.

Certain embodiments may include an energy retention device which inverts the force direction according to the sowed or deployed conditions operatively connected to the actuator handle and moveable in response to pivotal movement of the actuator handle assembly so as to exert a force in a direction to assist in pivotal movement of the actuator handle assembly into the deployed condition thereof when the direction of the force is above a center of the actuation shaft. The energy retention device may be an over-the-center (OTC) spring assembly that may be embodied in an assembly comprising a quadrant bell crank operatively connected to the actuation shaft, a moveable guide terminal having one end pivotally connected to the quadrant bell crank, a guide shaft coupled to the guide terminal for axial movements therebetween, a pair of spring seats respectively fixed to the guide shaft and the moveable guide terminal so as to define greater and lesser separation distances therebetween in response to rotational movement of the actuation shaft and a compression spring operably positioned between the spring seats.

According to some embodiments, the emergency device will be positionally retained within the device bay with a safety strap. The actuator assembly may therefore additionally (or alternatively) be provided with a system to disengage the safety strap to thereby allow deployment of the emergency device (especially an inflatable life raft). According to such embodiments, therefore, the actuator assembly may be provided with a cable guide attached to the actuator shaft, a strap hook adapted to be engaged with a safety strap associated with the emergency device and a cable interconnecting the cable guide and the strap hook. Rotation of the actuator handle to the deployed condition will therefore responsively rotate the cable guide by virtue of the rotation of the actuator shaft to thereby pivotally disengage the strap hook from the safety strap associated with the emergency device.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

Figure 11:
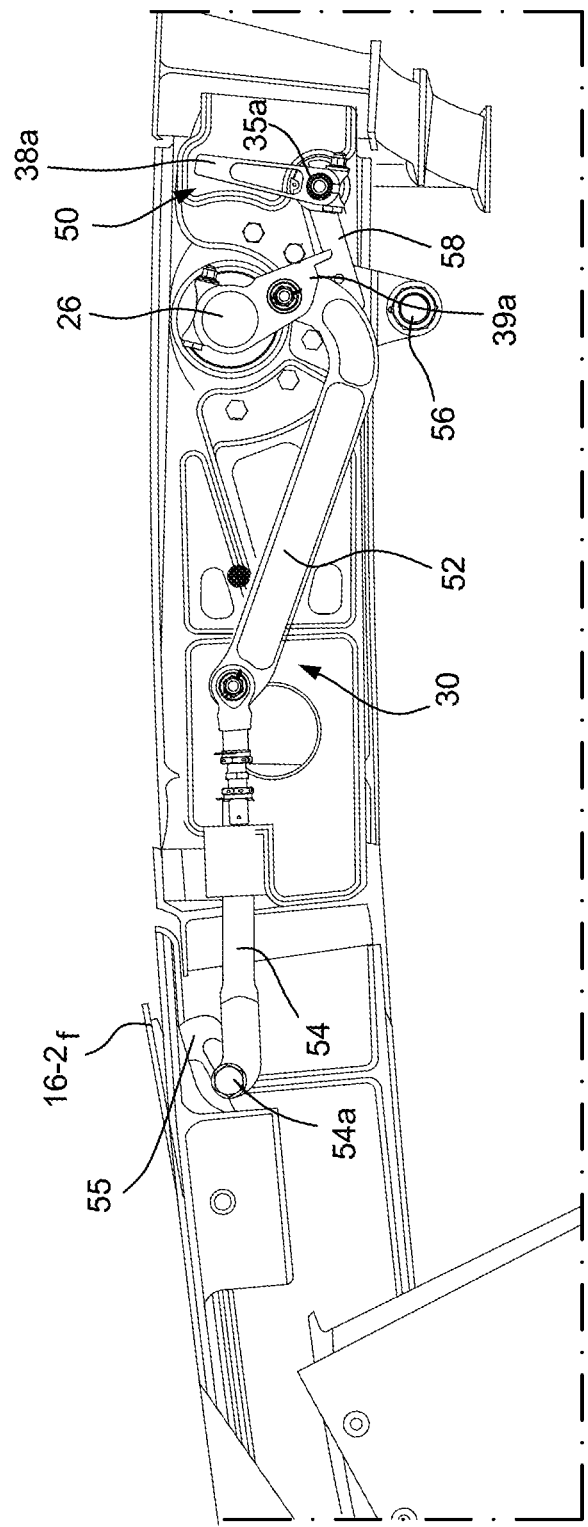
Figure 12:
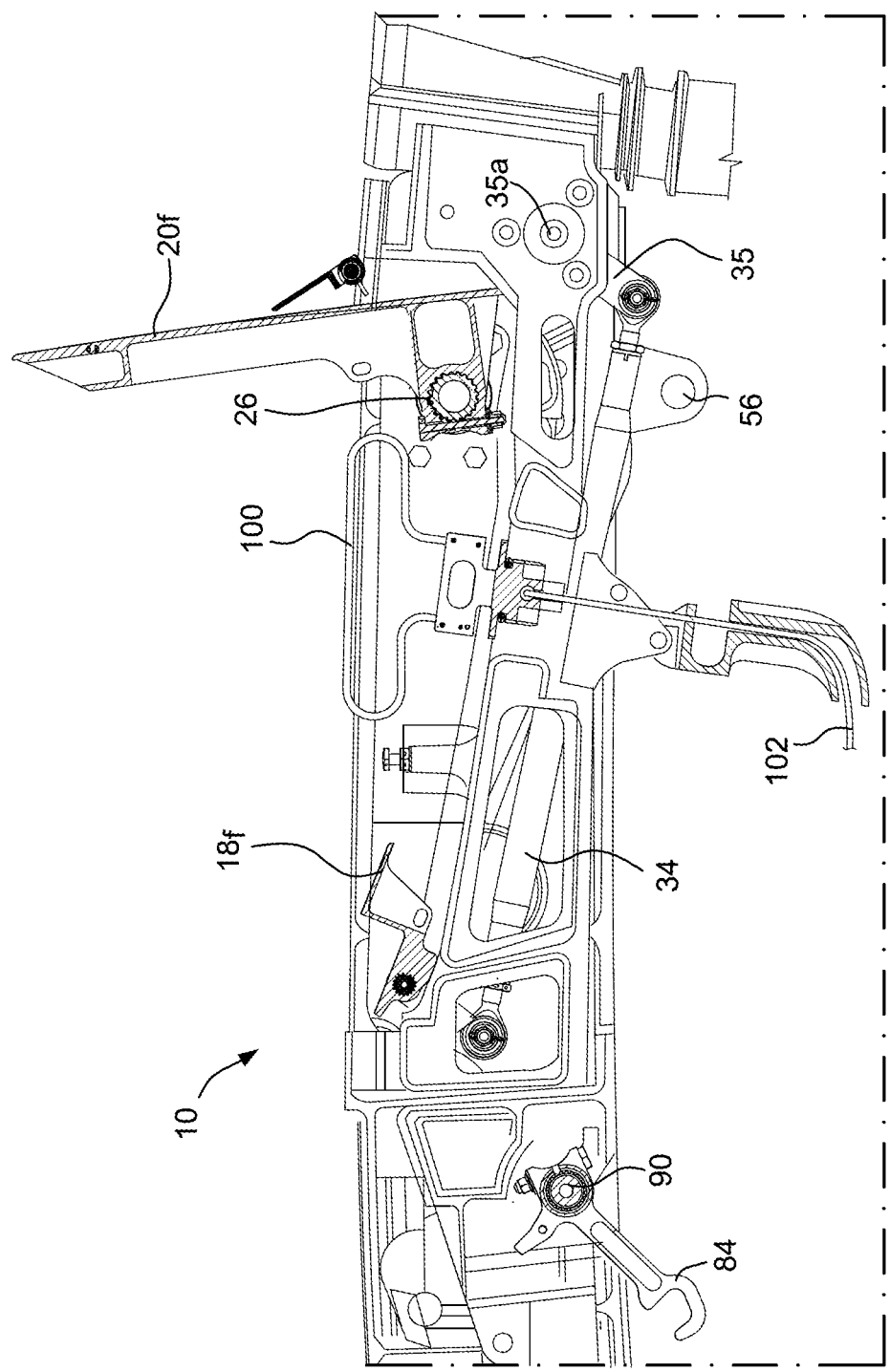

FIG. 11 is cross-sectional elevational view showing the locking system in a condition whereby the panel latches are in an unlocked and unlatched condition; and FIG. 12 is a cross-sectional elevational view showing the emergency device deployment cable access when the latching system is in an unlocked and unlatched condition as depicted in FIG. 11 to thereby allow deployment of the inflatable emergency device.

DETAILED DESCRIPTION OF EMBODIMENTS

Figure 1:
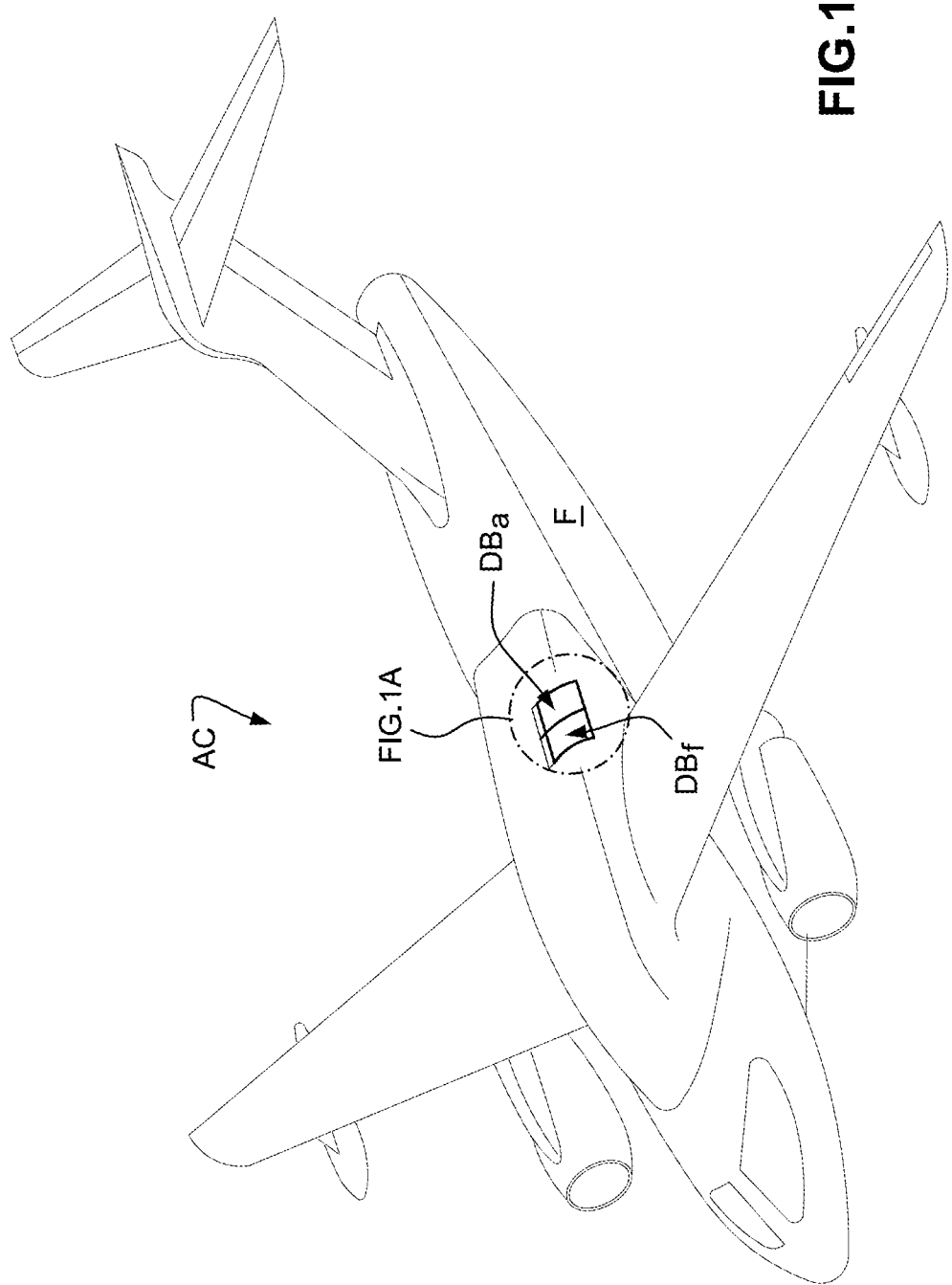
FIG. 1 is a schematic perspective view showing an aircraft with on-board emergency devices contained in emergency device bays that employ the actuation assemblies in accordance with an embodiment of the herein disclosed invention.
Figure 1A:
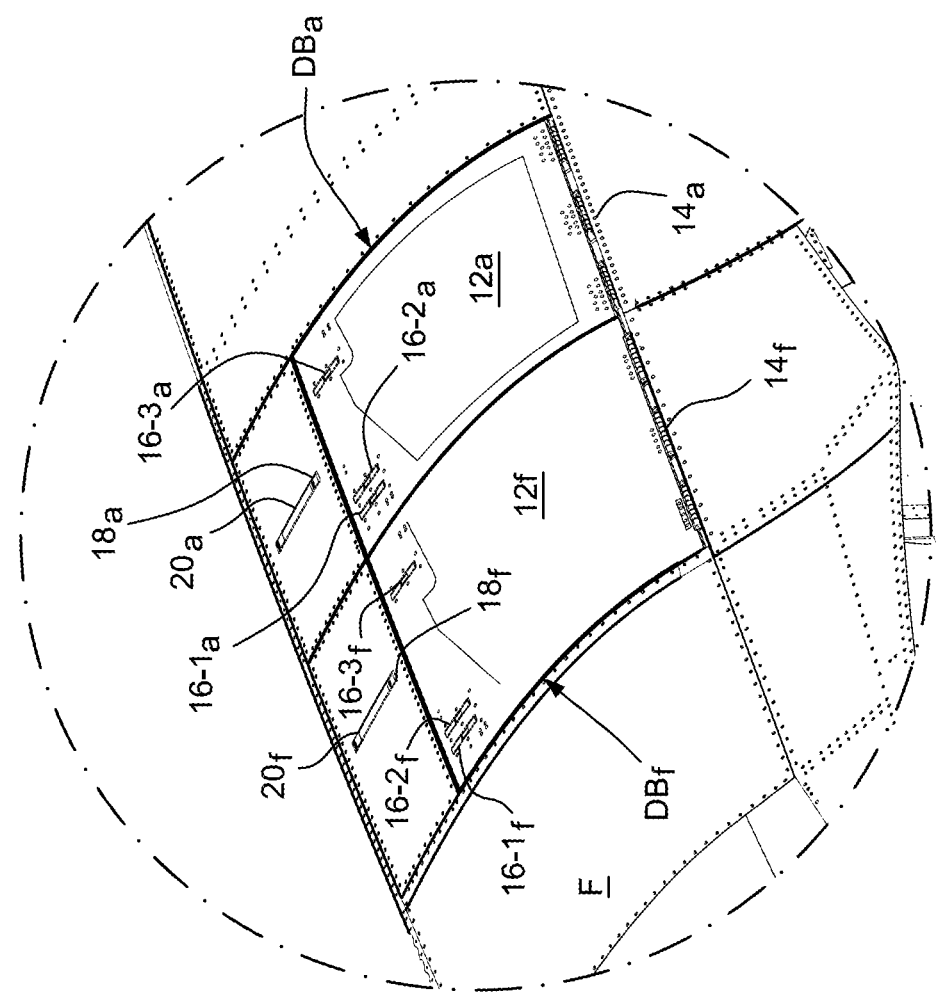
FIG. 1A is an enlarged view of the emergency device bays associated with the aircraft fuselage as shown in FIG. 1.

As is shown in FIGS. 1 and 1A, an exemplary aircraft AC is shown as being provided with fore and aft emergency device bays $DB_f$ and $DB_a$ in an upper portion of the aircraft fuselage F, each of which is sized and configured to accommodate an emergency floatation device FD (commonly referred to in the art as a "life raft"). As is customary, the emergency floatation devices FD are capable of being inflated and deployed manually during a water landing emergency evacuation of the aircraft. The fore and aft emergency device bays $DB_f$ and $DB_a$ are respectively provided with access fuselage skin panels $12_f$, $12_a$, respectively, having hinges $14_f$, $14_a$ at one end and panel access latches $16-1_f$, $16-2_f$, $16-3_f$ and $16-1_a$, $16-2_a$, $16-3_a$ at an opposite end.

Figure 2:
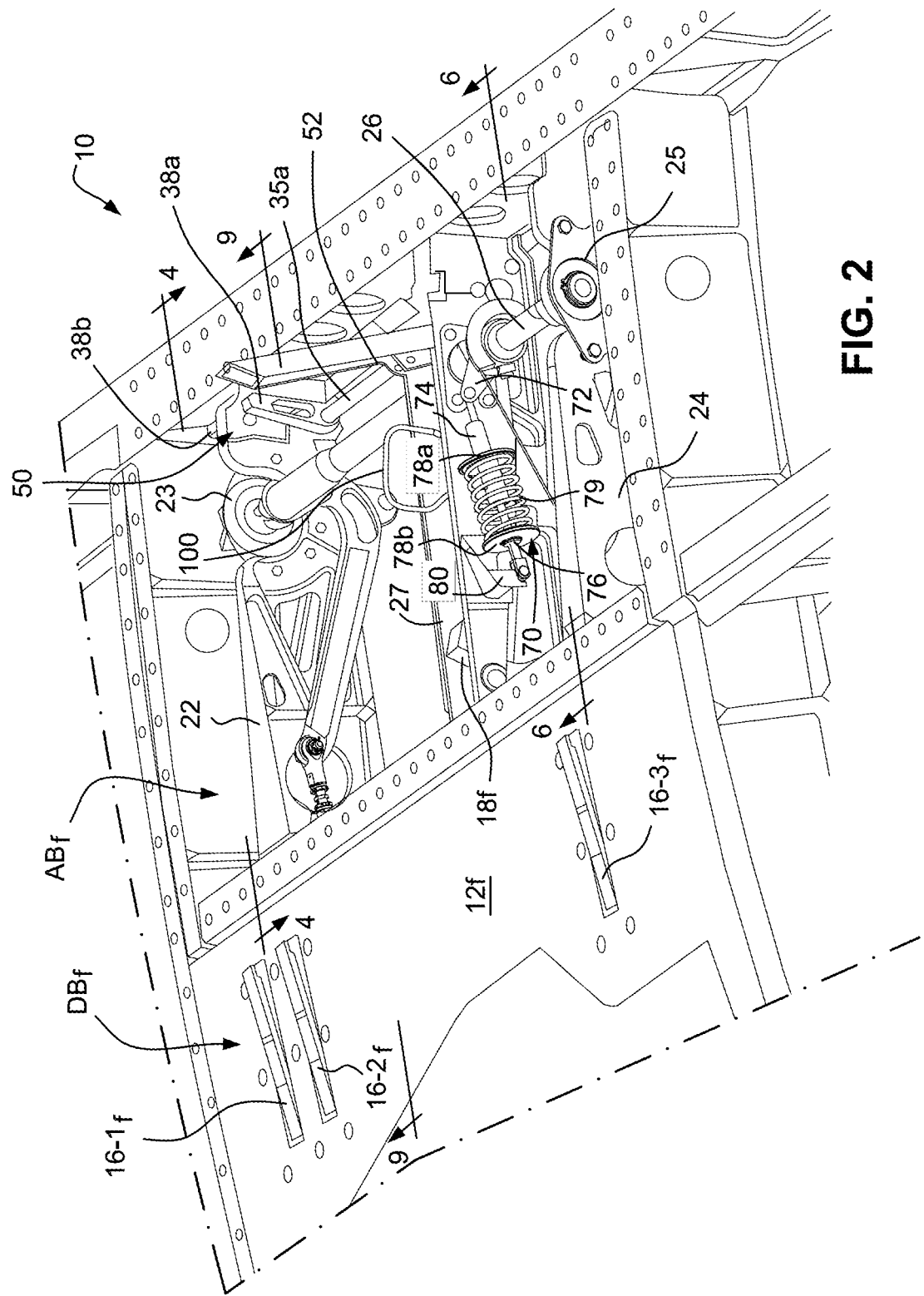
FIG. 2 is a top perspective view of an exemplary actuation assembly bay associated with an emergency device bay of the aircraft but having the fuselage skin removed for ease of presentation so as to visibly reveal the actuation assembly in accordance with an embodiment of the subject invention housed therein in an unlatched and unlocked condition.

Each of the emergency device bays $DB_f$, $DB_a$ is preferably provided with an emergency device actuation assembly in accordance with an embodiment of the herein disclosed invention which includes a manually operable safety release button 18$f$, 18$a$ and actuation lever 20$f$, 20$a$ respectively axially aligned with one another. A representative emergency device actuation assembly 10 in accordance with an embodiment of the herein disclosed invention associated with the fore emergency device bay $DB_f$ is depicted in greater detail in accompanying FIG. 2, it being noted that not all structures associated with the actuation assembly are depicted in FIG. 2 for clarity of presentation. For ease of reference, the following discussion will focus on the structures associated with the actuation device 10 operatively associated with the fore emergency device bay $DB_f$ but it is to be understood that such discussion will apply equally to the structures associated with the actuation assembly 10 operatively associated with the aft emergency device bay $DB_a$ (as well as any other bay provided in the aircraft AC with an emergency device bay).

In general, the actuation device 10 may include a latching system 30, a locking system 50 associated with each of the panel access latches $16-1_f$, $16-2_f$, $16-3_f$, and an over-the-center (OTC) spring actuation system 70, each of which will be explained in greater detail below. The latching system 30 is positioned within an actuation bay $AB_f$ associated operatively with the device bay $DB_f$ as shown in FIG. 2. The actuation bay $AB_f$ includes a pair of lateral support spars 22, 24 supporting bearing assemblies 23, 25 between which an actuation shaft 26 is disposed so as to be rotatable about its elongate axis. An actuator housing box 27 is disposed between the support spars 22, 24 and houses the safety lock button 18$f$ of the locking system 50 and the actuator lever 20$f$ of the latching system 30 and the spring actuation system 70.

Figure 3:
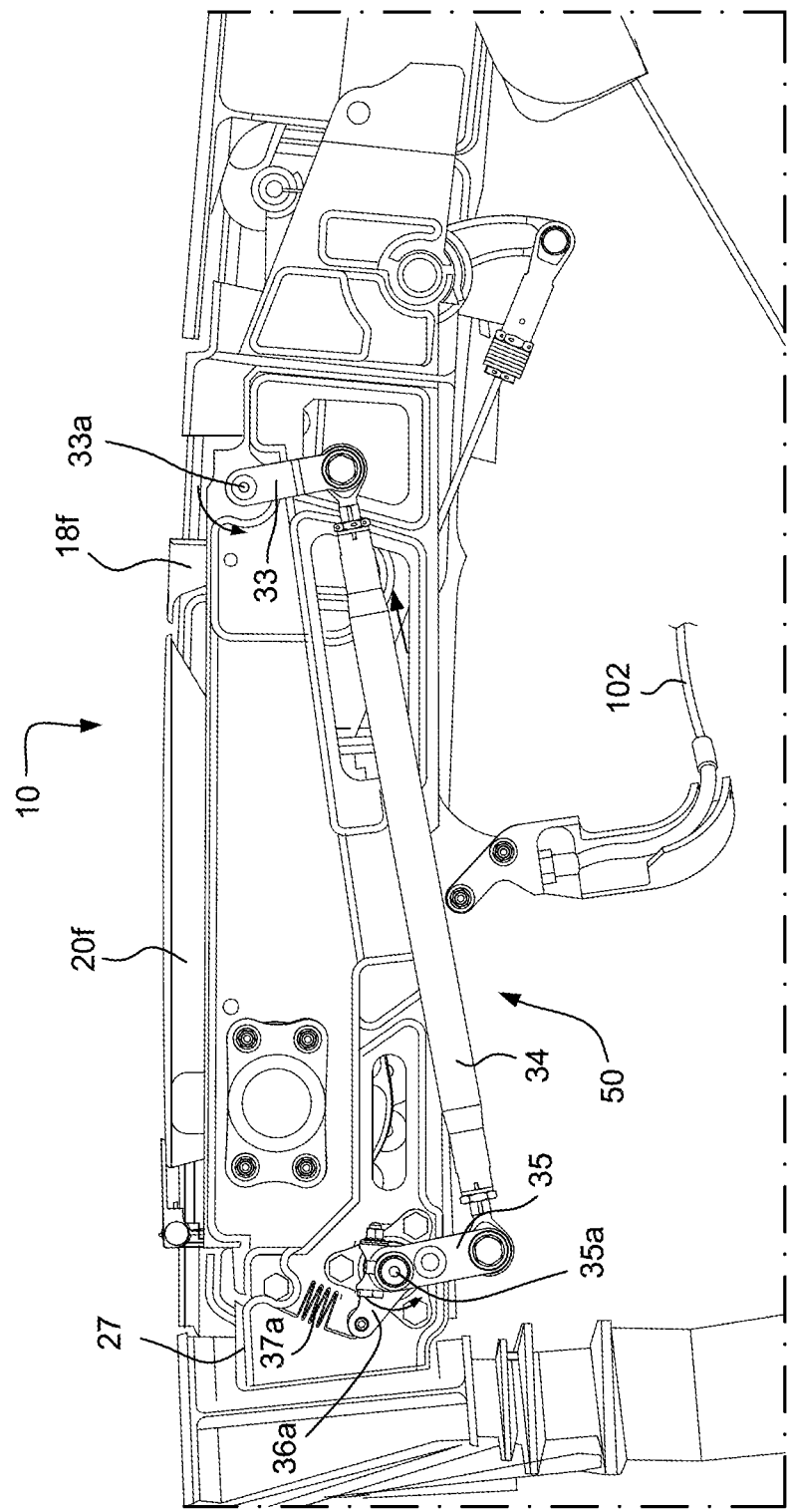
FIG. 3 is an cross-sectional elevational view of the latch system of the actuation assembly in a latched and locked condition.

The locking system 50 is shown in greater detail in accompanying FIG. 3 and is positioned physically within the actuator housing box 27. As noted above, the locking system 50 includes a safety lock button 18f which is operatively connected to a linkage system which includes a proximal bell crank 33 linked to a distal bell crank 35 by a connecting rod 34. Physically pushing (depressing) the lock button 18f will thereby cause the bell crank 33 to rotate in a counterclockwise direction (as viewed in FIG. 3) about the axis of the support shaft 33a. This rotation of the bell crank 33 will thus be translated by the connecting rod 34 to the bell crank 35 causing similar counterclockwise rotation thereof (as viewed in FIG. 3) about the axis of support shaft 35a. The support shaft 35a also carries links 36a, 36b which will rotate with the shaft 35a in a counterclockwise direction (as viewed in FIG. 3) in response to the lock button 18f being depressed against the spring force of a tension springs 37a, 37b extending between the links 36a, 36b, respectively, and the fixed structure of the housing box 27.

Figure 4:
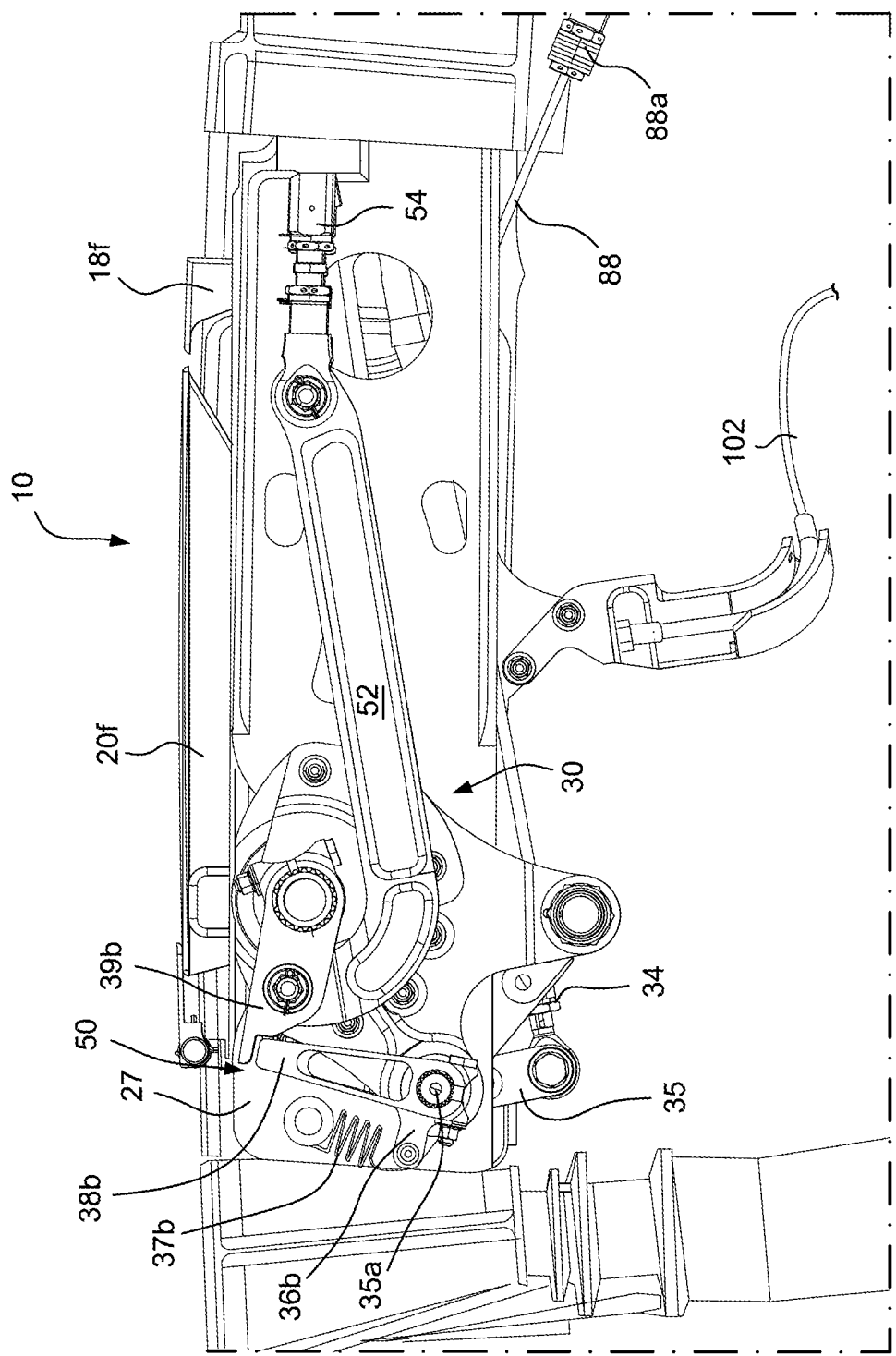
FIG. 4 is a cross-sectional elevational view of the locking system associated with one of the panel latches taken along lines 4-4 in FIG. 2 but depicted in a locked condition.
Figure 5:
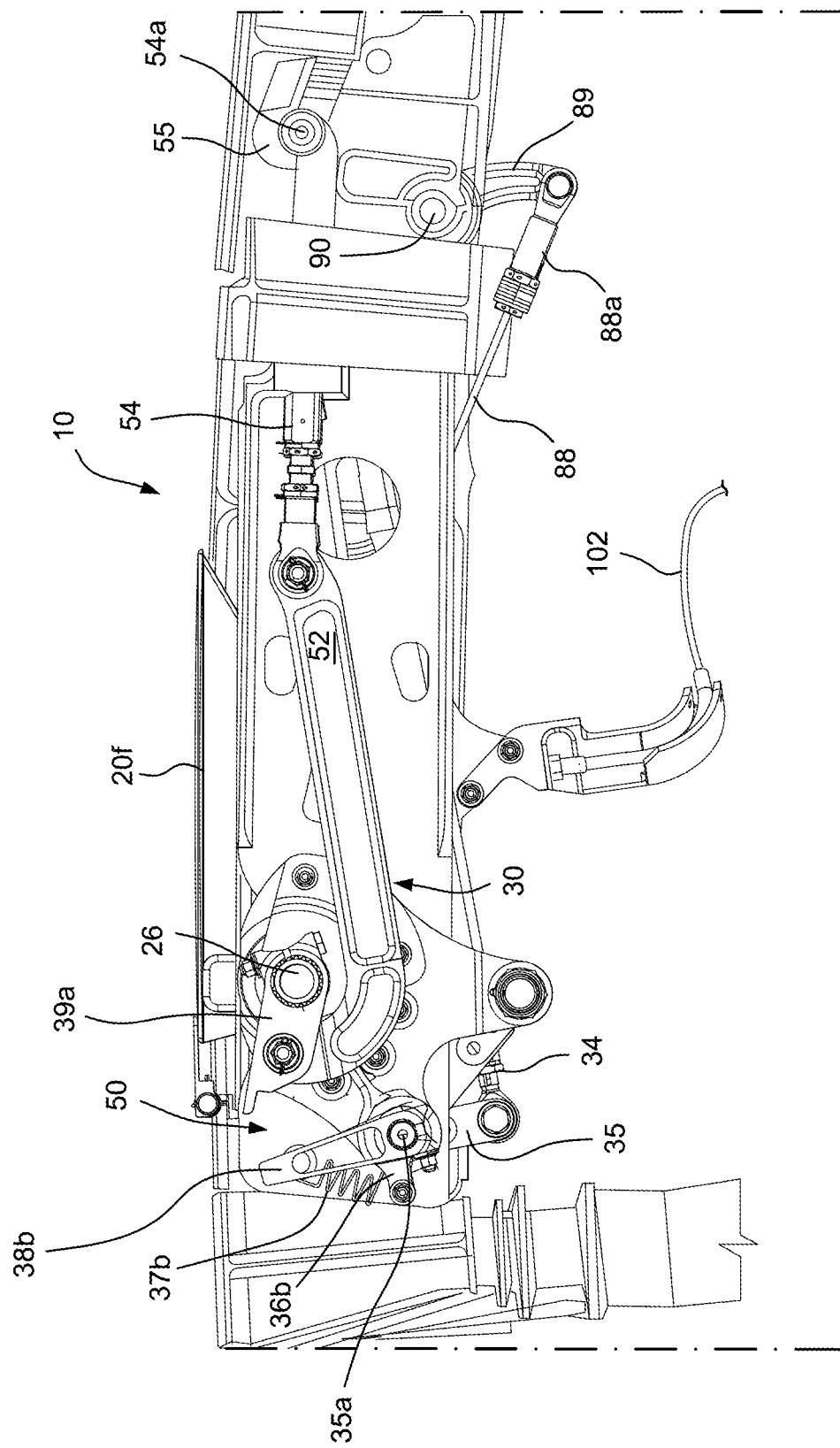
FIG. 5 is a cross-sectional elevational view of the locking system depicted in FIG. 4 but in an unlocked condition thereof.
Figure 9:
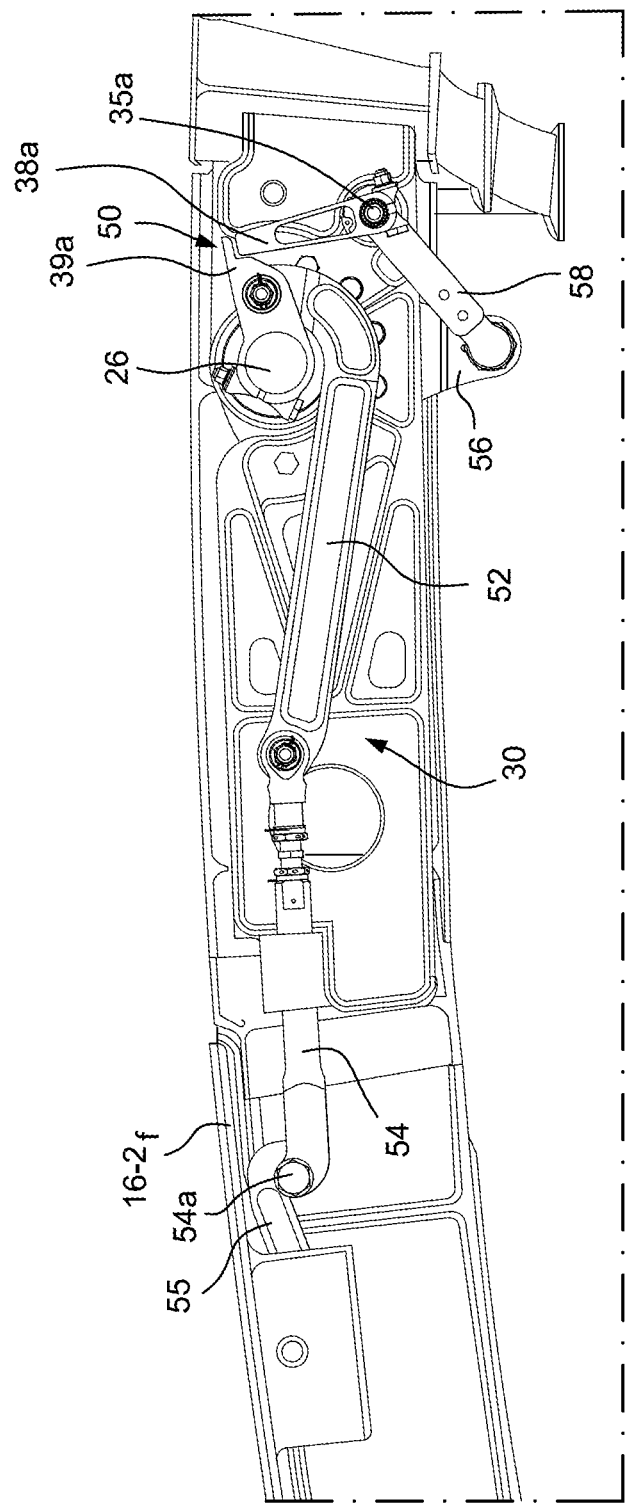
FIG. 9 is a cross-sectional elevational view of the locking system associated with another one of the panel latches taken along lines 9-9 in FIG. 2 but depicted in a locked condition.
Figure 10:
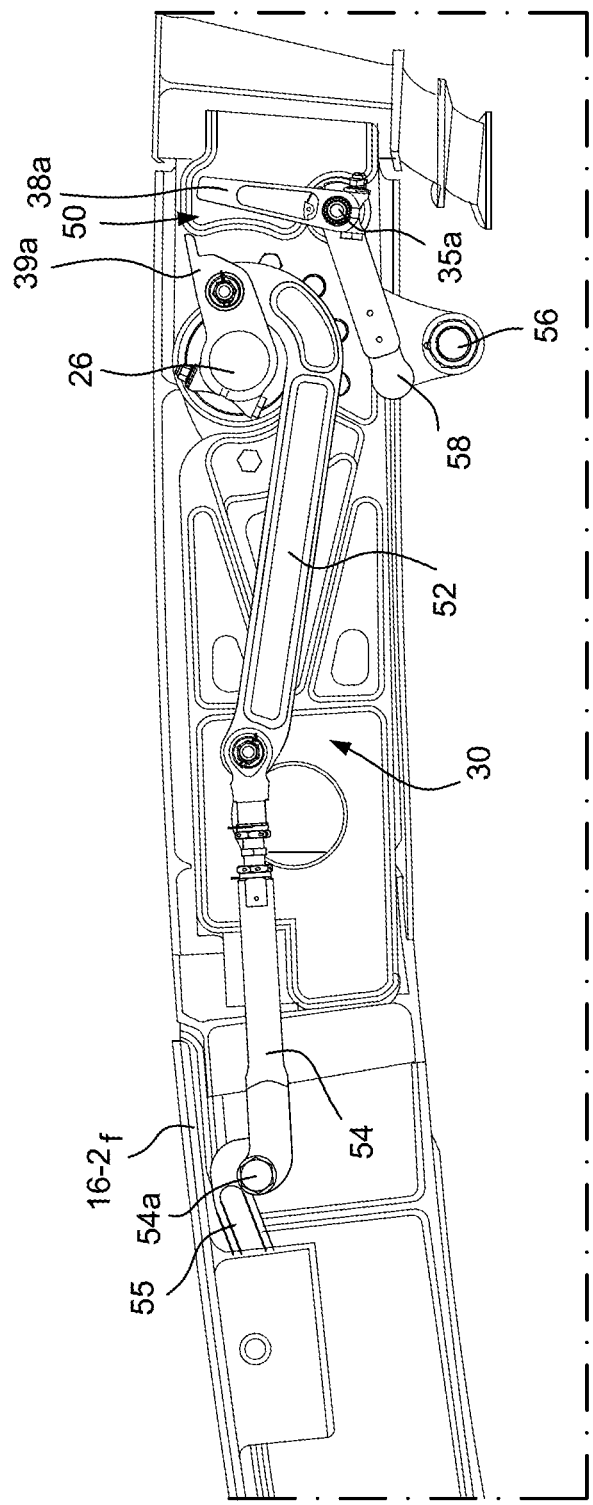
FIG. 10 is a cross-sectional elevational view of the locking system shown in FIG. 9 in an unlocked condition.

As is shown by FIG. 2, the shaft 35a is rotatably supported between the support spar 22 and the actuator box 27 by suitable bearings at each end thereof. The shaft 35a will thereby be rotatably driven in a counterclockwise direction (as viewed in FIG. 3) in response to the lock button 18f being physically depressed. As is shown by FIGS. 4-5 and 9-11 the shaft 35a rigidly carries respective latch stops 38a, 38b positioned on respective opposite sides of the spar 22 which are operatively moveable into engaged and disengaged positions relative to safety latches 39a, 39b carried by the actuation shaft 26 (not shown in FIG. 2 but see FIGS. 4-5 and 9-11). Therefore, in response to the counterclockwise rotational movement of the shaft 35a (as viewed in FIG. 3), these latch stops 38a, 38b will be rotationally moved from their normally engaged position (e.g., as shown in FIGS. 4 and 9) to a disengaged position (e.g., as shown in FIGS. 5 and 10) relative to their respective safety latches 39a, 39b. Such rotational movement is however against the spring force of the tension springs 37a, 37b which is exerted in a direction encouraging rotation of the shaft 35a to cause the latch stops 38a, 38b to be moved into the engaged position thereof relative to the safety latches 39a, 39b and thereby assist in maintaining the actuation system in a "safe mode".

While in the engaged position, the structural interaction between the latch stops 38a, 38b and the safety latches 39a, 39b, respectively, will prevent the actuation lever 20f from being manually moved from its normally stowed position (e.g., as shown in FIG. 3). The actuation assembly 10 will thereby be in an "armed mode" and ready to operate so as to allow inflation and deployment of the floatation device FD (i.e., by manually moving the actuation lever 20f into a deployment position as shown in FIG. 2) once the latch stops 38a, 38b are in a disengaged position relative to their respective safety latches 39a, 39b as will be explained below.

Several mechanical safety interconnections and latches will be concurrently disconnected and unlatched upon manual pivotal movement being exerted on the actuation lever 20f so as to move it from the stowed to the deployment conditions. In this regard, it will be observed from FIGS. 6-8 that the OTC spring actuation system 70 will assist in movement of the actuation lever 20f into the deployed condition and will ensure that the actuation lever will remain in the deployed condition once it has been manually actuated. Specifically, the actuation shaft 26 rigidly carries a quadrant bell crank 72 that is operatively connected to a spring compression assembly comprised of a movable guide terminal 74 that is pivotally connected to the bell crank 72 and axially coupled to a guide shaft 76 by way of a moveable terminal bushing 76a connected to a terminal end of the guide shaft 76 and a fixed bushing 76b within the guide terminal 74. An axially separated pair of spring seats 78a, 78b are fixed to the guide shaft 76 and the movable guide terminal 74, respectively, so as to retain therebetween a compression spring 79. A proximal end of the guide shaft 76 opposite the terminal end thereof is pivotally connected to a support 80 associated with the housing box 27.

Figure 6:
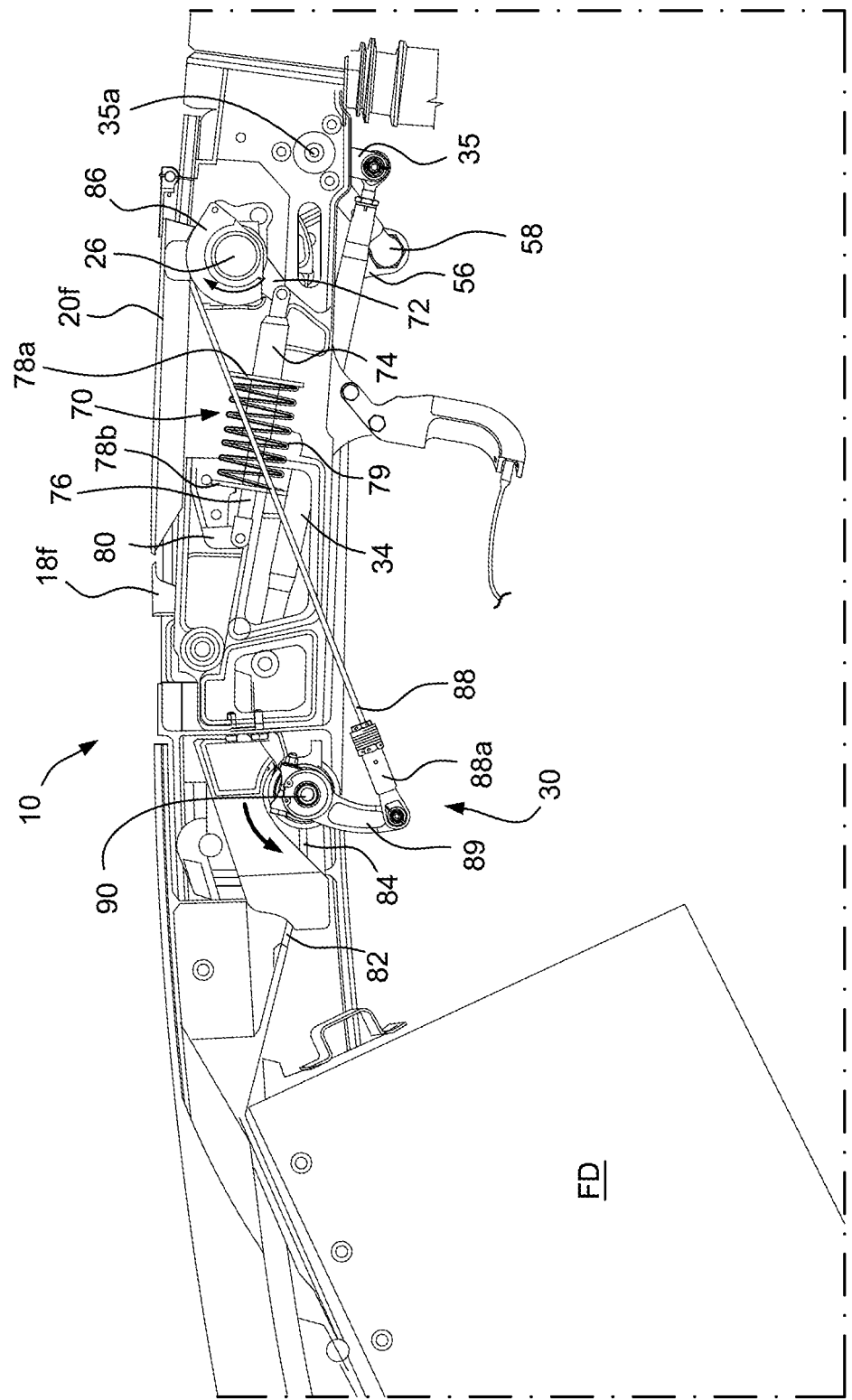
FIG. 6 is a cross-sectional elevational view of the over-the-center (OTC) spring actuation system and the latching system taken along lines 6-6 in FIG. 2 but shown in a locked and latched condition.
Figure 7:
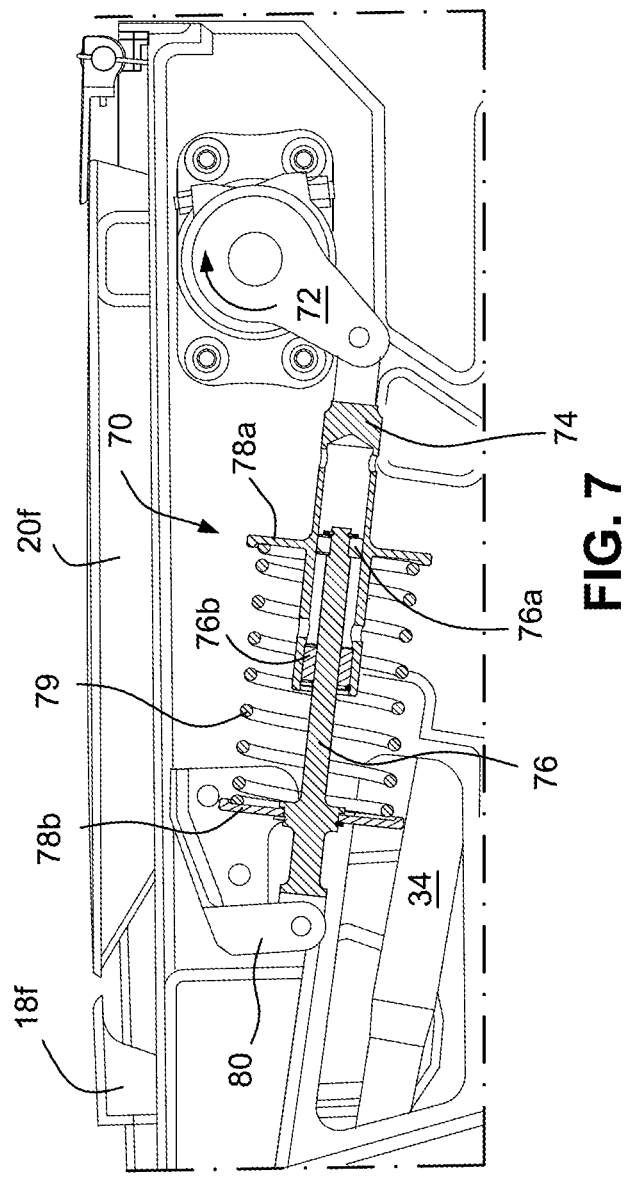
FIG. 7 is a more detailed cross-sectional elevational view of the over-the-center (OTC) spring actuation system shown in FIG. 6 in a locked and latched condition.
Figure 8:
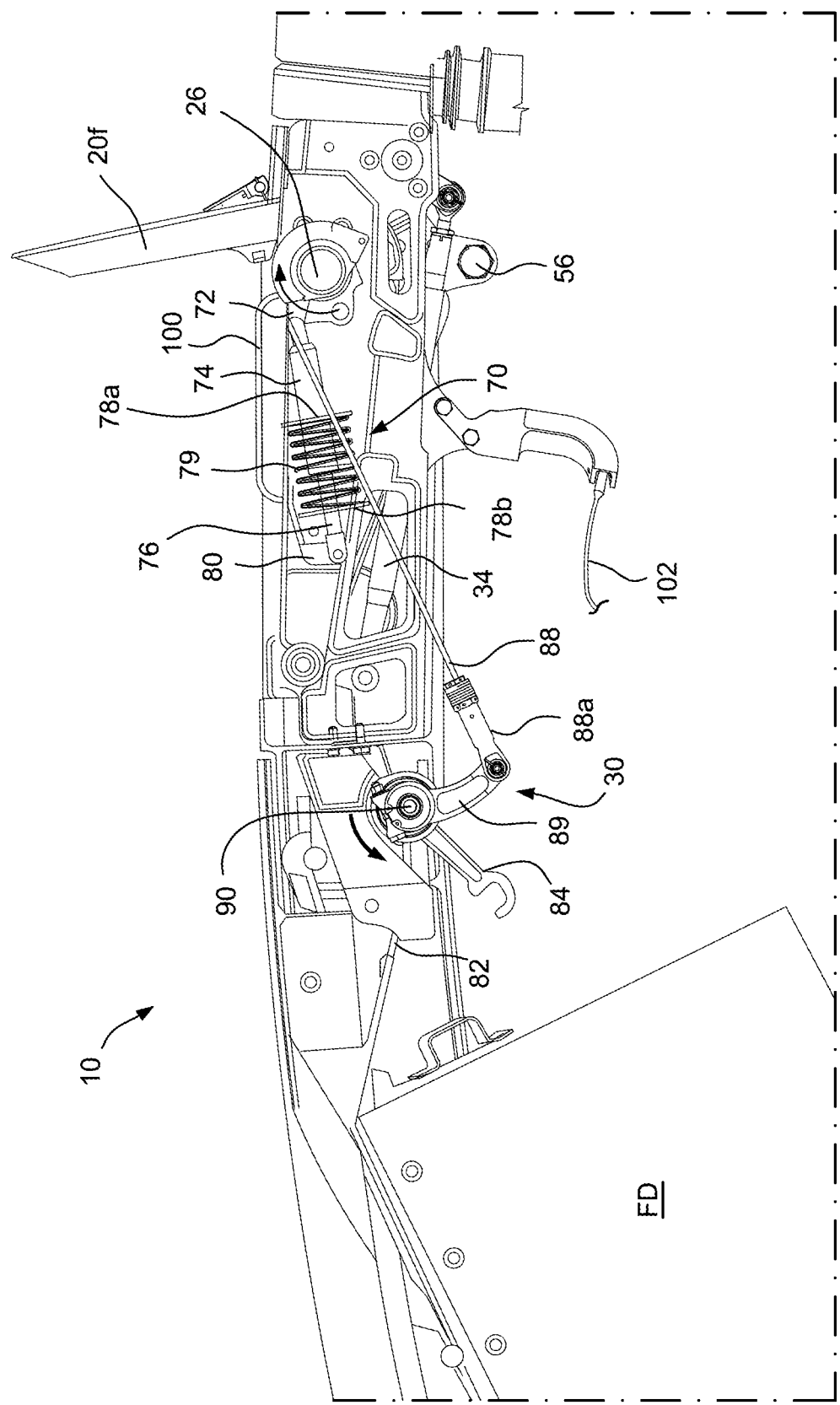
FIG. 8 is a cross-sectional elevational view of the over-the-center (OTC) spring actuation system and the latching system depicted in FIG. 6 but shown in an unlocked and unlatched condition.

As is shown in FIGS. 6 and 8, in response to manual pivotal movements applied to the actuation lever 20f, the actuation shaft 26 will be rotated in a clockwise direction (as viewed in FIGS. 6-8). It will be observed in this regard that the axial direction of compression force exerted by the spring 79 is positioned below the center axis of the actuation shaft 26 when the actuation lever 20f is in the stowed condition. During rotation of the lever 20f from its stowed condition and into its deployed condition, the spring 79 will be compressed between the spring seats 78a, 78b. Once the axial direction of the shaft 76 is oriented so as to be above the center of the shaft 26, the spring force exerted by the spring 79 will then assist in further rotational movement of the handle 20f and hence the shaft 26 is the clockwise direction. Upon reaching its fully deployed condition, the spring force exerted by the spring 79 will thereby assist retention of the handle 20f in such deployed condition. As such, the OTC spring assembly 70 serves as a safety mechanism to ensure that the disconnection and unlatching that accompanies the movement of the handle 20f from the stowed to the deployed conditions will remain in such states while also ensuring that the connection and latching of the mechanisms when the handle 20f is in the stowed condition is maintained during normal operation of the aircraft AC.

As is also shown in FIGS. 6 and 8, the floatation device FD is positionally held with in the bay $DB_f$ below the panel $12_f$ by a safety strap 82 which is normally engaged at its terminal end with a strap hook 84. In order to release such engagement between the strap 82 and strap hook 84, the actuation assembly 10 includes a cable guide 86 fixed to and thereby rotatable with the actuation shaft 26. A cable 88 extends from the cable guide 86 to a cable terminal 88a, the latter being operable connected to a bell crank 89 which is carried by shaft 90. The proximal end of the strap hook 84 is in turn fixed to the shaft 90 so as to be rotatable therewith. Upon pivotal movement of the actuation shaft 26 occasioned by manual operation of the actuation lever 20f into its deployed condition, the cable 88 causes the shaft 90 to rotate in a counterclockwise direction (as viewed in FIGS. 6 and 8) thereby in turn pivotally moving the strap hook 84 from its engaged condition with the strap 82 (as shown in FIG. 6) and into its disengaged position (as shown in FIG. 8).

As noted previously the actuation system 10 includes a latching system 30 associated with each of the access panel latches $16\text{-}1_f$, $16\text{-}2_f$ and $16\text{-}3_f$. As is perhaps best shown by FIGS. 9-11 which depicts a representative latching system 30 operatively associated with the panel latch $16\text{-}2_f$, each latching system 30 will comprise a linkage system having a drive link 52 with a proximal end fixed to and thereby rotatable with the actuation shaft 26. A distal end of the drive link 52 is pivotally connected to the proximal end of an axially moveable engagement rod 54 having an engagement keeper 54a at a terminal distal end thereof. As is shown in FIG. 9, the engagement keeper 54a of the rod 54 is normally engaged with a latch hook 55 associated with the latch $16\text{-}2_f$. Disengagement between the keeper 54a and latch hook 55 will only be allowed once the actuation system is in the "armed mode", i.e., by depressing the lock button 18f and thereby causing the latch stops 38a, 38b carried by support shaft 35a to be pivotally moved into a disengaged position relative to their respective safety latches 39a, 39b as has been previously described. Such a state is shown in FIG. 10. Upon the actuation lever 20f being pivoted manually into it fully deployed condition, the drive link 52 will axially move the engagement keeper 54a into a disengaged relationship with the latch hook 55 thereby releasing the panel latch 16-2$_f$. Such a state is depicted in FIG. 11. The sequence of operation as described above will also occur simultaneously with respect to the other panel latches 16-1$_f$ and 16-3$_f$ so as to thereby release engagement of the access panel 12f to allow the floatation device FD to be released from the bay DB$_f$.

As shown, e.g., in FIG. 12, an inflation handle 100 positioned in the housing 27 will be exposed once the actuator lever 20f is moved to its fully deployed condition. The inflation handle 100 is operatively connected to the self-contained inflation system (typically a compressed gas system) integrally included with the floatation device via a lanyard cable 102. Therefore, in a conventional manner an individual (e.g., a crew member) may inflate the floatation device FD by forcibly pulling on inflation handle 100. It will be appreciated that the inflation of the floatation device FD will only occur after all latches and mechanical interconnections that retain the floatation device FD and its associated structures (e.g., the access panels 12$_f$, 12$_a$) are disengaged and/or uncoupled by operation of the actuation assembly 10 as described previously. Thus, inflation of the floatation device FD will allow it to be removed from its associated bay DB$_f$, DB$_a$ and deployed for use during evacuation of the aircraft AC during a water landing emergency.

In order to provide a positive indication that the actuation assembly 10 is in an "armed mode" whereby the actuation lever 20$_f$ may be operated to allow inflation of the floatation device FD, a sensor 56 may be provided in operative association with a sensor target 58. In this regard, as is also show in FIGS. 9-11, the sensor target 58 is in adjacent covering relationship to the sensor 56 when the actuation assembly 10 is in a stowed condition but is rotated out of such adjacent covering relationship upon actuation of locking system 50 (i.e., since the sensor target 58 is connected operably to the shaft 35a so as to be pivotally moveable therewith). The sensor 56 may be operatively connected to a visible indicator (not shown), such as local and/or cockpit mounted panel annunciator lights, so as to provide a visible indication that the actuation system 10 is in an "armed mode" condition thereby enabling operation of the actuation handle 20$_f$ and inflation of the floatation device FD.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. An actuation assembly to allow access to an on-board emergency device removably positioned within a device bay of a vehicle and normally covered by an access panel, the actuation assembly comprising:
    a rotatable actuation shaft;
    a manually operated actuation lever fixed to the actuation shaft so as to rotate the actuation shaft in response to movement of the actuation lever between stowed and deployed conditions thereof; and
    a safety locking system operably connected to the rotatable shaft and having a locked condition which prevents operation of the actuation lever to thereby maintain the actuation assembly in a safe mode during normal vehicle operation, and an armed mode which allows the actuation lever to be moved into the deployed condition thereof, wherein the safety locking system comprises:
        (i) a manually operated lock button;
        (ii) at least one safety latch carried by the actuation shaft so as to be rotatable therewith;
        (iii) at least one latch stop mounted for rotatable movement into engaged and disengaged positions relative to the at least one safety latch; and
        (iv) a linkage assembly interconnecting the lock button and the at least one latch stop, wherein
    operation of the lock button responsively causes the at least one latch stop to be rotatably moved from the engaged position and into the disengaged position thereby by the interconnecting linkage assembly whereby the actuation lever may be operated to rotate the actuation shaft.

2. The actuation assembly according to claim 1, wherein the linkage assembly comprises:
    a proximal bell crank operatively connected to the lock button;
    a distal bell crank operatively connected to the at least one latch stop; and
    a connecting rod which operatively interconnects the proximal and distal bell cranks, wherein
    operation of the lock button rotates the proximal bell crank which responsively rotates the distal bell crank by the connecting rod and thereby rotatably move the at least one latch stop into the disengaged position thereof relative to the at least one safety latch.

3. The actuation assembly according to claim 2, wherein the linkage assembly further comprises a spring which exerts a spring force in a direction to encourage rotation of the at least one latch stop into the engaged position thereof relative to the at least one safety latch.

4. The actuation assembly according to claim 2, further comprising a sensor system to sense the actuation assembly being in the armed mode.

5. The actuation assembly according to claim 4, wherein the sensor system comprises:
    a fixed position sensor, and
    a moveable sensor target operatively connected to the at least one latch stop so as to be pivotally movable therewith between (i) a safe condition mode indication position wherein the sensor target is in adjacent covering relationship to the sensor when the at least one latch stop is in the engaged position thereof, and (ii) an armed condition mode indication position wherein the sensor target uncovers the sensor when the at least one latch stop is in the disengaged position thereof.

6. The actuation assembly according to claim 1, which further comprises a latching system operatively interconnected to the actuation lever and the safety locking system, wherein the latching system includes:
    a drive link having a proximal end connected to the actuation shaft so as to be rotatable therewith; and
    an engagement rod operably connected at one end to a distal end of the drive link and having an opposite end movable into and out of engagement with a latch hook associated with a latch of the access panel, wherein movement of the actuation lever into the deployed condition causes the engagement rod to moved out of engagement with the latch hook.

7. The actuation assembly according to claim 6, further comprising an over-the-center (OTC) spring assembly operatively connected to the actuation lever and moveable in response to pivotal movement of the actuation lever so as to exert a spring force in a direction to assist in pivotal movement of the actuation lever into the deployed condition thereof when the direction of the spring force is above a center of the actuation shaft.

8. The actuation assembly according to claim 7, wherein the OTC spring assembly comprises:
a quadrant bell crank operatively connected to the actuation shaft;
a moveable guide terminal having one end pivotally connected to the quadrant bell crank;
a guide shaft coupled to the guide terminal for axial movements therebetween;
a pair of spring seats respectively fixed to the guide shaft and the moveable guide terminal so as to define greater and lesser separation distances therebetween in response to rotational movement of the actuation shaft; and
a compression spring operably positioned between the spring seats.

9. The actuation assembly according to claim 1, further comprising:
a cable guide attached to the actuator shaft;
a strap hook adapted to be engaged with a safety strap associated with the emergency device; and
a cable interconnecting the cable guide and the strap hook, wherein
rotation of the actuation lever to the deployed condition rotates the cable guide by rotation of the actuator shaft to thereby pivotally disengage the strap hook from the safety strap associated with the emergency device.

10. An aircraft which comprises the actuation assembly according to claim 1.

11. An aircraft comprising:
an inflatable emergency device;
an emergency device bay having an interior space for containing the inflatable emergency device and including an access panel with at least one panel latch to cover the interior space and the inflatable emergency device contained therein,
an actuation assembly to allow deployment of the inflatable emergency device, and
a latching system operably connected to the at least one panel latch of the access panel, wherein
the actuation assembly includes:
a rotatable actuation shaft;
a manually operated actuation lever fixed to the actuation shaft so as to rotate the actuation shaft in response to movement of the actuation lever between stowed and deployed conditions thereof; and
a safety locking system operably connected to the rotatable shaft and having a locked condition which prevents operation of the actuation lever to thereby maintain the actuation assembly in a safe mode during normal vehicle operation, and an armed mode which allows the actuation lever to be moved into the deployed condition thereof, and wherein
the latching system includes:
a drive link having a proximal end connected to the actuation shaft so as to be rotatable therewith; and
an engagement rod operably connected at one end to a distal end of the drive link and having an opposite end movable into and out of engagement with a latch hook associated with the at least one latch of the access panel, wherein movement of the actuation lever into the deployed condition causes the engagement rod to move out of engagement with the latch hook.

12. The aircraft according to claim 11, wherein the linkage assembly comprises:
a proximal bell crank operatively connected to the lock button;
a distal bell crank operatively connected to the at least one latch stop; and
a connecting rod which operatively interconnects the proximal and distal bell cranks, wherein
operation of the lock button rotates the proximal bell crank which responsively rotates the distal bell crank by the connecting rod and thereby rotatably move the at least one latch stop into the disengaged position thereof relative to the at least one safety latch.

13. The aircraft according to claim 12, wherein the linkage assembly further comprises a spring which exerts a spring force in a direction to encourage rotation of the at least one latch stop into the engaged position thereof relative to the at least one safety latch.

14. The aircraft according to claim 11, further comprising a sensor system to sense the actuation assembly being in the armed mode, wherein the sensor system comprises:
a fixed position sensor, and
a moveable sensor target operatively connected to the at least one latch stop so as to be pivotally movable therewith between (i) a safe condition mode indication position wherein the sensor target is in adjacent covering relationship to the sensor when the at least one latch stop is in the engaged position thereof, and (ii) an armed condition mode indication position wherein the sensor target uncovers the sensor when the at least one latch stop is in the disengaged position thereof.

15. The aircraft according to claim 11, further comprising an over-the-center (OTC) spring assembly operatively connected to the actuation lever and moveable in response to pivotal movement of the actuation lever so as to exert a spring force in a direction to assist in pivotal movement of the actuation lever into the deployed condition thereof when the direction of the spring force is above a center of the actuation shaft.

16. The aircraft according to claim 15, wherein the OTC spring assembly comprises:
a quadrant bell crank operatively connected to the actuation shaft;
a moveable guide terminal having one end pivotally connected to the quadrant bell crank;
a guide shaft coupled to the guide terminal for axial movements therebetween;
a pair of spring seats respectively fixed to the guide shaft and the moveable guide terminal so as to define greater and lesser separation distances therebetween in response to rotational movement of the actuation shaft; and
a compression spring operably positioned between the spring seats.

17. The aircraft according to claim 11, wherein the inflatable emergency device comprises a safety strap, and wherein the aircraft further comprises:
a cable guide attached to the actuation shaft;
a strap hook operatively engaged with the safety strap associated with the inflatable emergency device; and a cable interconnecting the cable guide and the strap hook, wherein rotation of the actuation lever to the deployed condition rotates the cable guide by rotation of the actuation shaft to thereby pivotally disengage the strap hook from the safety strap associated with the inflatable emergency device.

18. The aircraft according to claim 11, further comprising an inflation handle which is covered by the actuation lever when in the stowed condition, but exposed when the actuation lever is in the deployed condition, and a lanyard interconnecting the inflation handle to an inflation system associated with the inflatable emergency device.

19. The aircraft according to claim 18, wherein the lock button and the actuation lever are axially aligned with one another.

20. The aircraft according to claim 18, wherein the actuation assembly functions to sequentially (1) unlock the safety locking system, (2) unlatch and release the safety strap and (3) allow inflation of the inflatable emergency device.

21. The aircraft according to claim 11, wherein the access panel includes a hinge at one end and an opposite end which includes the at least one panel latch, wherein the access panel may be pivoted about the hinge to allow access to the inflatable emergency device when the panel latch is unlatched.

\* \* \* \* \*